(12) United States Patent
Stewart

(10) Patent No.: US 7,685,622 B2  
(45) Date of Patent: Mar. 23, 2010

(54) TELEVISION SIGNAL RECEIVER SYSTEM

(75) Inventor: John Sidney Stewart, Indianapolis, IN (US)

(73) Assignee: Thomson Licensing, Isssy les Moulineaux (FR)

( * ) Notice: Subject to any disclaimer, the term of this patent is extended or adjusted under 35 U.S.C. 154(b) by 1073 days.

(21) Appl. No.: 10/494,233

(22) PCT Filed: Nov. 1, 2001

(86) PCT No.: PCT/US01/46355

§ 371 (c)(1), (2), (4) Date: May 3, 2004

(87) PCT Pub. No.: WO03/039140

PCT Pub. Date: May 8, 2003

(65) Prior Publication Data

US 2004/0252243 A1 Dec. 16, 2004

(51) Int. Cl.
- *H04N 7/18* (2006.01)
- *H04N 7/173* (2006.01)
- *H04N 7/16* (2006.01)

(52) U.S. Cl. .............. 725/74; 725/68; 725/71; 725/78; 725/131; 725/139; 725/151

(58) Field of Classification Search ............ 725/68, 725/70, 72, 78, 80, 82, 85; 348/614, 731
See application file for complete search history.

(56) References Cited

U.S. PATENT DOCUMENTS

| | | | | |
|---|---|---|---|---|
| 4,621,282 A | * | 11/1986 | Ahern | 725/144 |
| 5,512,937 A | * | 4/1996 | Beierle | 348/14.02 |
| 5,537,153 A |   | 7/1996 | Shigihara | |
| 5,608,722 A | * | 3/1997 | Miller | 370/320 |
| 5,638,112 A | * | 6/1997 | Bestler et al. | 725/151 |
| 5,646,942 A | * | 7/1997 | Oliver et al. | 370/312 |
| 5,666,365 A | * | 9/1997 | Kostreski | 370/486 |
| 5,673,293 A | * | 9/1997 | Scarpa et al. | 375/321 |

(Continued)

FOREIGN PATENT DOCUMENTS

EP 598576 5/1994

(Continued)

OTHER PUBLICATIONS

Patent Abstracts of Japan, vol. 2000, No. 26, Jul. 1, 2002 & JP 2001/251270.

(Continued)

*Primary Examiner*—Son P Huynh  
(74) *Attorney, Agent, or Firm*—Robert D. Shedd; Joseph J. Opalach; Brian J. Cromarty

(57) ABSTRACT

A television signal receiving system is operative to optimally tune to one or a plurality of television channels and provide one or plurality of optimum television channel signals to one or a plurality of television signal receivers. The television signal receivers are operative to request a particular channel of a television signal processor. The television signal processor is coupled to an antenna array. Television signals from the antenna array are processed in accordance with the principles of the subject invention to provide optimum television channel signals. The optimum television channel signals are demodulated then remodulated before being distributed to the various television signal receivers.

24 Claims, 9 Drawing Sheets

U.S. PATENT DOCUMENTS

| | | | |
|---|---|---|---|
| 5,760,819 | A | 6/1998 | Sklar et al. |
| 5,825,242 | A | 10/1998 | Prodan et al. |
| 5,905,941 | A * | 5/1999 | Chanteau ............... 725/127 |
| 5,936,660 | A * | 8/1999 | Gurantz ................. 725/71 |
| 5,970,386 | A * | 10/1999 | Williams ............... 725/69 |
| RE36,509 | E | 1/2000 | Shigihara |
| 6,104,908 | A * | 8/2000 | Schaffner et al. ........ 725/78 |
| 6,134,419 | A * | 10/2000 | Williams .............. 725/151 |
| 6,263,503 | B1 * | 7/2001 | Margulis .............. 725/81 |
| 6,377,981 | B1 * | 4/2002 | Ollikainen et al. ...... 709/217 |
| 6,559,797 | B1 * | 5/2003 | Chang ................. 342/368 |
| 6,588,017 | B1 * | 7/2003 | Calderone ............. 725/120 |
| 6,622,307 | B1 * | 9/2003 | Ho .................... 725/120 |
| 6,691,311 | B1 * | 2/2004 | Yata et al. ............ 725/68 |
| 6,745,392 | B1 * | 6/2004 | Basawapatna et al. .... 725/120 |
| 6,915,529 | B1 * | 7/2005 | Suematsu et al. ........ 725/78 |
| 6,966,077 | B2 * | 11/2005 | Cho .................... 4/295 |
| 6,992,730 | B1 | 1/2006 | Sautter et al. |
| 7,020,890 | B1 * | 3/2006 | Suematsu et al. ........ 725/78 |
| 7,137,138 | B2 * | 11/2006 | Shibata et al. ......... 725/81 |
| 2001/0055351 | A1 * | 12/2001 | Malkemes et al. ....... 375/347 |
| 2002/0057745 | A1 * | 5/2002 | Friedman ............... 375/295 |
| 2002/0163593 | A1 * | 11/2002 | Liu et al. ............. 348/614 |
| 2002/0181572 | A1 * | 12/2002 | Meehan et al. .......... 375/229 |
| 2003/0028890 | A1 * | 2/2003 | Swart et al. ........... 725/91 |
| 2003/0053412 | A1 * | 3/2003 | Yoshida et al. ......... 370/208 |

FOREIGN PATENT DOCUMENTS

| | | |
|---|---|---|
| JP | 6-165178 | 6/1994 |
| JP | 6-233158 | 8/1994 |
| JP | 8-331468 | 12/1996 |
| JP | 2001/251270 | 9/2001 |
| WO | WO 01/01598 A2 | 1/2001 |

OTHER PUBLICATIONS

Search report dated Jul. 1, 2002.

* cited by examiner

TELEVISION SIGNAL RECEIVER SYSTEM

This application claims the benefit, under 35 U.S.C. §365 of International Application PCT/US01/46355, filed Nov. 1, 2001, which was published in accordance with PCT Article 21(2) on May 8, 2003 in English.

The present invention relates to the reception and distribution of digital television signals and, more particularly, to the reception, processing and distribution of terrestrially broadcast television signals.

One manner in which television signals are currently broadcast is over-the-air or terrestrially. This type of transmission of television signals requires an antenna or aerial in order to receive the television signals. The antenna is adapted to receive television signals constituting a plurality of television channels. Each broadcaster transmits or broadcasts a particular television channel signal, with typically several television broadcasters in an area. A television channel signal typically includes audio and video information and may contain other data as well.

Traditionally, such television broadcasts have been in analog format (i.e. analog television signals). It is well known that various problems exist and/or can occur with regard to the reception of terrestrially broadcast analog television signals. Furthermore, in the United States, the terrestrial or over-the-air broadcasting of digital television signals is expected to become more prevalent in the near future. Digital television signals pose different problems than analog television signals in addition to some of the same problems with regard to the reception of digital television signals. One such reception problem manifests itself as "ghosting." Other problems manifest themselves as just poor reception. Poor reception can occur if the antenna is not positioned in a proper orientation to receive certain television channels.

Additionally, more and more households have more than one television set and/or television signal receiver. Typically, each television set and/or television signal receiver is not viewing the same channel. Since an antenna needs to be positioned according to an appropriate orientation in order to receive particular television channels with minimal problems, it is not generally possible to optimally receive multiple television channels.

Thus, in view of the above, it is desirable to provide a television signal receiver and/or receiving system that can receive a plurality of analog and/or digital television signals and provide one or more optimum television signals (channels) to one or more television sets or television signal receivers.

The phrase "television signal receiver" (TSR) as used herein is intended to encompass any apparatus, with or without display, capable of receiving television signals. For example, television signal receivers include, but not limited to, television sets, video tape recorders (VTR), set-top boxes, digital versatile disk (DVD) recorders, and any combination thereof.

The subject invention is a system, method and apparatus for receiving and distributing terrestrial television signals to one or more television signal receivers. Particularly, the subject invention is a television signal processing device that provides an optimum television channel signal for one or more selected terrestrial television channels from an antenna array. A terrestrial television channel is preferably selected by a television signal receiver in communication with the television signal processor. The processing device obtains the optimum television channel signal from a plurality of the received terrestrial television channels. The processing device can also provide multiple and different television channel signals.

In accordance with an aspect of the subject invention, there is provided a method of processing a television signal. The method includes the steps of: (a) receiving a selected terrestrial television signal on a plurality of antennas; (b) converting the selected terrestrial television signal received on each one of the plurality of antennas into a digitized signal; (c) summing the digitized signals into an aggregate signal; (d) demodulating the aggregate signal; (e) modulating the demodulated aggregate signal; and (f) distributing the modulated aggregate signal to a television signal receiver.

In accordance with another aspect of the subject invention, there is provided an apparatus for processing a television signal. The apparatus includes means for receiving a selected terrestrial television signal via a plurality of antennas, means for converting the selected terrestrial television signal received on each one of the plurality of antennas into a digitized signal, means for summing the digitized signals into an aggregate signal, means for demodulating the aggregate signal, and means for modulating the demodulated aggregate signal.

In accordance with yet another aspect of the subject invention, there is provided an apparatus for processing a television signal. The apparatus includes a plurality of tuners each of which is couplable to one antenna of an antenna array and operative to receive a selected terrestrial television channel signal, from the one antenna, a converter in communication with each one of the plurality of tuners and operative to convert the selected terrestrial television channel signal into a digitized television channel signal, a summer in communication with each one of the converters and operative to combine each digitized television channel signal to form an aggregate television channel signal, a demodulator in communication with the summer and operative to demodulate the aggregate television channel signal, and a modulator in communication with the demodulator and operative to modulate the demodulated aggregate television channel signal.

The above-mentioned and other features and advantages of this invention, and the manner of attaining them, will become more apparent and the invention will be better understood by reference to the following description of embodiment(s) of the invention taken in conjunction with the accompanying drawings, wherein.

Corresponding reference characters indicate corresponding parts throughout the drawings.

Figure 1:
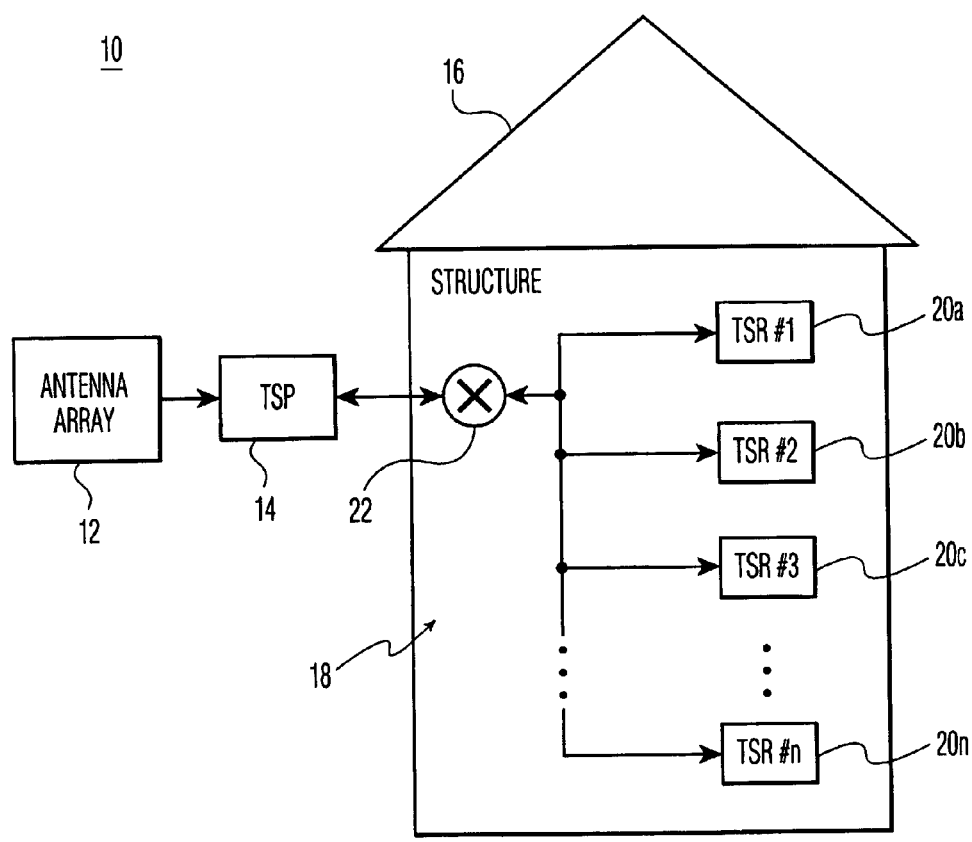
FIG. 1 is a representation of an exemplary television signal reception, processing, and distribution system in accordance with the principles of the subject invention.

Referring now to the drawings and, more particularly to FIG. 1, there is depicted an exemplary configuration of an exemplary television signal receiving system, generally designated 10, in accordance with the principles of the subject invention. The television signal receiving system 10 includes an antenna consisting of a plurality of antennas or an antenna array, generally designated 12, and a television signal processor or processing unit (TSP) 14 that is in communication with the antenna array 12.

The antenna array 12 is operative to receive television signals constituting various television channels. Hereinafter, the term "television signal" will be considered synonymous with "television channel" unless indicated to the contrary. In particular, the antenna array 12 is operative to receive a plurality of terrestrially broadcast television signals or channels. The television signals may be analog, digital, and/or a combination of analog and digital television signals. The antenna array 12 is preferably composed of a plurality of separate antennas each one of which is operative to receive the plurality of television signals (channels). The frequency band or range of coverage of each antenna of the antenna array 12 is preferably the same. As well, each antenna is preferably a uni-directional antenna. However, it should be appreciated that directional antennas, or a combination of uni-directional and directional antennas may be used to constitute the antenna array 12.

The television signal processor or processing unit (TSP) 14 is operative to receive all of the television signals received by the antenna array 12 and process the television signals according to the principles of the subject invention. Particularly, the TSP 14 is operative to receive all of the television signals received by the antenna array 12, tune to one or more selected television channels from or via the received television signals, digitize the received television signals, provide any format conversion necessary on the one or more selected television channels, obtain an optimum television channel signal for each selected television channel from the received television channels, and provide or distribute the optimum television channel signal to a distribution area 18. The distribution area includes one or more television signal receivers (TSR) 20.

More particularly, the TSP 14 individually receives television signals (constituting a plurality of television channels) from each antenna of the antenna array 12. Each tuner or tuning circuitry/logic is tuned to a particular television channel (frequency or frequency band received by the respective antenna) according to control signals received by the TSP 14. Each tuner of the TSP 14 may be tuned to the same television channel. Alternatively, some tuners may be tuned to the same television channel while other tuners may be tuned to different television channels. Alternatively, all tuners may be tuned to different television channels. The number of tuners tuned to a particular television channel is variable, depending on the number of television channel requests. The number of television channels to tune to is limited by the number of particular antennas in the antenna array 12 (and thereafter by the number of TSRs).

After processing each (or the same) tuned television channel, the television channel(s) signals are processed (e.g. undergo format conversion if necessary, and otherwise digitize the television signals). Television channel signals that are the same are combined or summed to produce or generate an aggregate or optimum television channel signal. Each optimum television channel signal is further processed and provided to the TSRs. It should thus be appreciated that the antenna array 12 is coupled to the TSP 14 such that the TSP 14 may separately tune each antenna or television signal from each antenna to a particular television channel. This may be accomplished for example, by having a separate conductor for each antenna of the antenna array 12 between the respective antenna and the TSP 14.

In one form, each optimum television channel signal is further processed by first demodulating the optimum television channel signal then remodulating the optimum channel signal before distributing the optimum television channel signal to the appropriate TSR. The optimum television channel signal may be digitally encoded such as with Vestigial SideBand (VSB) or may be analog encoded such as with National Television Standards Committee (NTSC). Remodulation of the demodulated optimum television channel signal is preferably performed using the original optimum television channel signal modulation scheme, but may use any modulation scheme appropriate for the intended use.

The TSP 14 is in communication with a signal splitter/combiner 22 that is typically within the distribution area 18. The distribution area 18 includes one or a plurality of television signal receivers (TSRs) represented by TSR #1 20a, TSR #2 20b, TSR #3 20c through TSR #n 20n each of which is in communication with the signal splitter/combiner 22. The splitter/combiner 22 is operative to accept a plurality of television channel signals from the TSP 14 and provide the plurality of television channel signals to the plurality of TSRs 20a, 20b, and 20c through 20n. The splitter/combiner 22 is also operative to accept return path signals from the plurality of TSRs 20a through 20n and provide the return path signals to the TSP 14. The return path signals from the TSRs 20a through 20n provide control data for the TSP 14. Further, the return path signals from the TSRs 20a through 20n provide data regarding the particular TSR generating or issuing a command and/or sending data. Thus the splitter/combiner 22 is operative to allow bidirectional communication between the TSP 14 and the plurality of TSRs 20a through 20n.

The TSRs 20a through 20n may form part of the television signal receiving system 10. AS such, each TSR is operative receive television signals from the TSP 14 and utilize the received television signals as per the particular TSR. Additionally, in accordance with an aspect of the subject invention, each TSR 20a through 20n is operative to tune to (select) a particular television channel for use thereof (e.g. viewing on a display or recording) and communicate the selected particular television channel via return path signals to the TSP 14. In response thereto, the TSP 14 processes those television signals corresponding to the selected television channel. The TSP 14 then provides an optimum television channel signal corresponding to the selected television channel. In accordance with a further aspect of the subject invention, each TSP 14 may be operative to select a particular television channel for viewing but request that the selected particular television channel be provided on a television channel that is different than the selected particular television channel. In essence, the TSR is operative to assign a selected television channel to another television channel. The assignment is carried out by the TSP 14 as described herein.

In FIG. 1, the television signal receiving system 10 is arranged such that the antenna array 12 is exterior to the structure or building (e.g. house) 16. In other words, the antenna array 12 is outside. Again, the antenna array 12 may be formed of different antenna, similar antenna, or any combination of antenna all of which are designed to receive television signals. The TSP 14 is positioned preferably in close proximity to the antenna array 12 but external to the structure 16. Power for the TSP 14 may be self-contained such as in the form of batteries, or may be supplied via (supported by) the connection between the distribution area 18 and the TSP 14. The TSRs 20a through 20n represent components or devices that are operative to utilize television signals. The structure 16 may have only one TSR, two TSRs, or multiple TSRs, although multiple TSRs are shown in FIG. 1. The TSRs are operative to allow a user to select (or tune to) a particular television channel or station through a remote control system (see FIG. 5) and/or an OSD system (see FIG. 5), or the TSR may automatically select or tune to a particular television channel. Additionally, the TSR is operative to provide control (request) signals to the TSP 14 such that the selected television channel is provided on a channel that is different than the selected television channel. Since each TSR is operative to perform channel assignment (or re-assignment), the TSP 14 is operative to resolve any discrepancies (i.e. where more than one TSR requests the same channel re-assignment).

Figure 2:
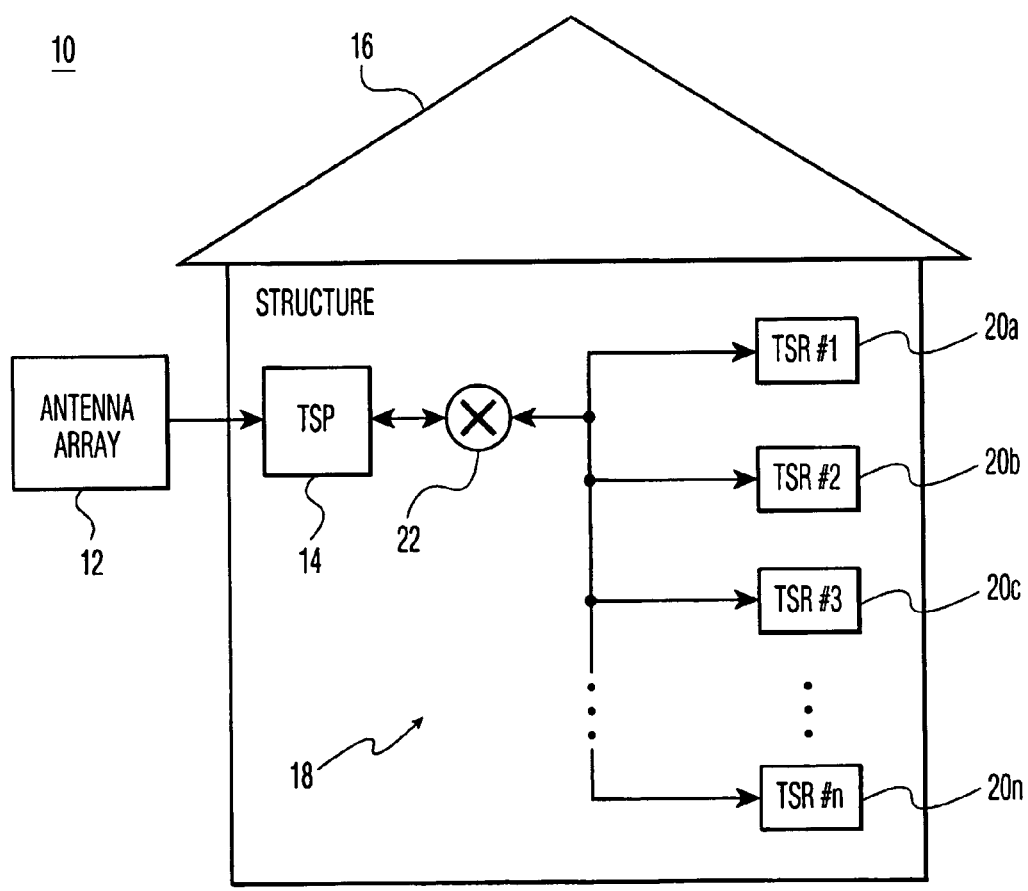
FIG. 2 is a representation of an exemplary television signal reception, processing, and distribution system in accordance with the principles of the subject invention.

In FIG. 2, there is shown another embodiment of the television signal receiving system 10. The television signal receiving system 10 of FIG. 2 includes the antenna array 12, the television signal processing unit 14, and at least one TSR 20. The television signal receiving system 10 includes and/or performs the same functions and/or features of the various components thereof in like manner to the television signal receiving system 10 of FIG. 1. However, in FIG. 2, the TSP 14 is located within the structure 16. In this case the antenna array 12 may include a pre-amplifier (not shown) configured to provide signal amplification for the television signal received by each antenna of the antenna array 12.

Figure 3:
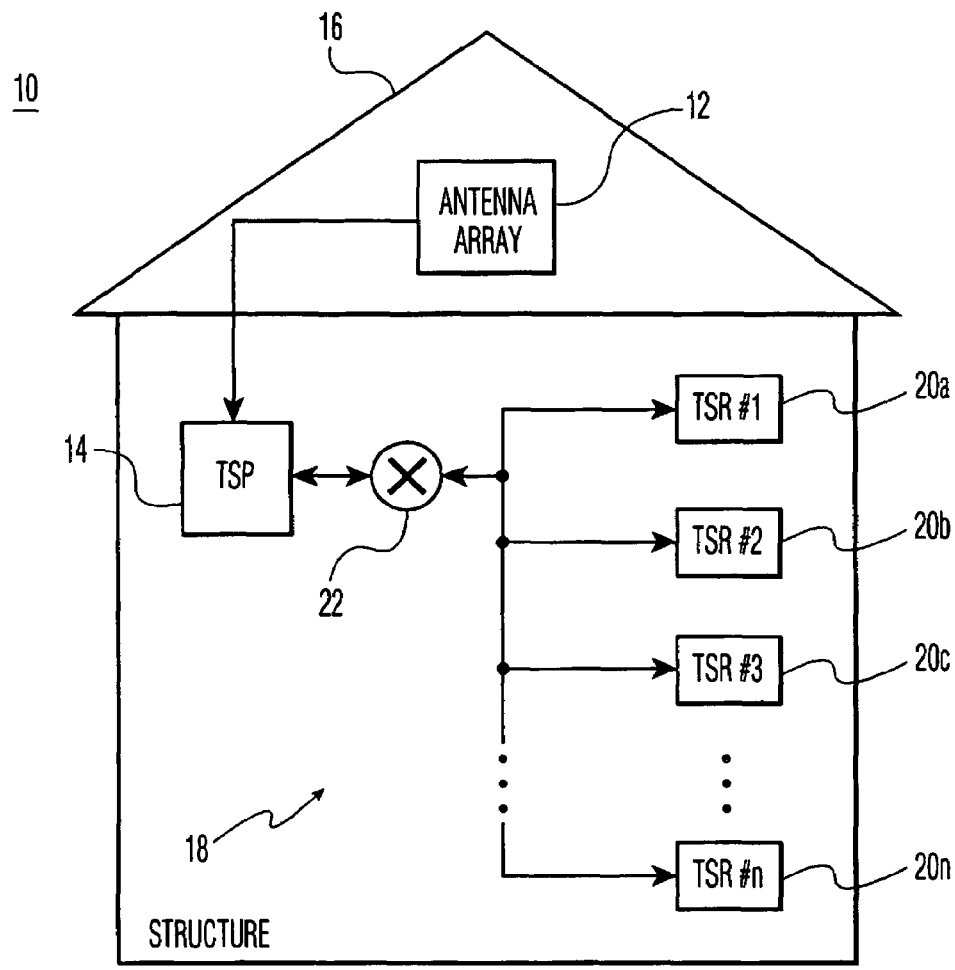
FIG. 3 is a representation of an exemplary television signal reception, processing, and distribution system in accordance with the principles of the subject invention.

In FIG. 3, there is shown another embodiment of the television signal receiving system 10. The television signal receiving system 10 of FIG. 3 includes the antenna array 12, the television signal processing unit 14, and at least one TSR 20. The television signal receiving system 10 includes and/or performs the same functions and/or features of the various components thereof in like manner to the television signal receiving system 10 of FIGS. 1 and 2. However, in FIG. 3, all of the components are located within the structure 16. The antenna array 12 is preferably located in an upper area of the structure 16 for best reception. The TSRs 20 may be located anywhere within the structure 16. Additionally, it should be appreciated that some or all of the TSRs do not need to be internal to the structure 16. The TSRs 20a through 20n may be located in any part of the structure 16. For example, if the structure 16 was an apartment building, each TSR 20a through 20n may be separate apartments.

Figure 4A:
FIG. 4A is a high level block diagram representation of an exemplary television signal receiver TSR) in accordance with the principles of the subject invention.
Figure 4B:
FIG. 4B is a high level block diagram representation of an exemplary television signal receiver in accordance with the principles of the subject invention.
Figure 4C:
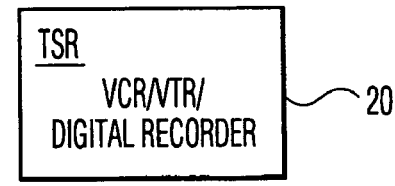
FIG. 4C is a high level block diagram representation of an exemplary television signal receiver in accordance with the principles of the subject invention.
Figure 4D:
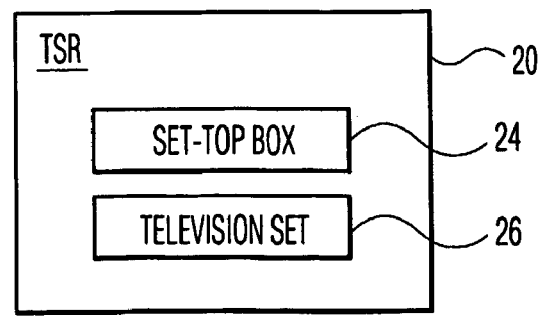
FIG. 4D is a high level block diagram representation of an exemplary television signal receiver in accordance with the principles of the subject invention.

FIGS. 4A through 4D illustrate various exemplary television signal receivers (TSRs), generally designated 20, that may be used in the exemplary systems described herein in accordance with the present principles. In FIG. 4A, the TSR 20 comprises a set-top box. In FIG. 4B, the TSR 20 comprises a television set. In FIG. 4C, the TSR 20 comprises a VCR, VTR, digital recorder, or the like. In FIG. 4D, the TSR 20 comprises a set-top box coupled to a television set. Of course, it should be appreciated that various combinations of TSRs are likewise contemplated, as well as other types of television signal receivers.

The set-top box (FIG. 4A) is operative to receive television signals from the TSP 14, process the received television signals, and forward the received television signals to a display device or other TSR, in addition to other typical functions and/or features of a set-top box. The set-top box may be a cable television receiver, a satellite receiver, or the like. In accordance with an aspect of the subject invention, the set-top box is also operative to generate or produce a request (control signal) for a particular television channel and forward the request to the TSP 14. A user may initiate the request for a particular television channel or the set-top box may initiate the request. The user may initiate a television channel request via a remote control system (see FIG. 5) such as by using number buttons or channel up/down arrow buttons on a remote control, or on-screen display (OSD) (see FIG. 5) typically with the aid of a remote control. The TSR 20 may itself initiate the request. The set-top box is also operative to provide a request (control signal) for the selected television channel to be received by the set-top box on a television channel that is different than the selected television channel.

The television set (FIG. 4B) is operative in the same manner as the set-top box of FIG. 4A. The television set, however, includes an integral display for showing the video portion of the television signals and typically an integral sound system (speakers) for playing the audio portion of the television signals. The television set may also include various features not typically associated with a set-top box but which are either not necessary for the subject invention or incidental thereto.

The VCR/VTR/Digital Recorder (FIG. 4C) is operative in the same manner as the set-top box of FIG. 4A. The VCR/VTR/Digital Recorder, however, may include various features not typically associated with a set-top box but which are either not necessary for the subject invention or are incidental thereto and thus not shown or described.

The set-top box/television set combination (FIG. 4D) utilizes the features and/or functions of both the set-top box and the television set. In this case, either the set-top box or the television set provides the control signals to the TSP 14 for requesting a television channel and optionally being provided the selected television channel on a television channel that is different than the selected television channel.

Figure 5:
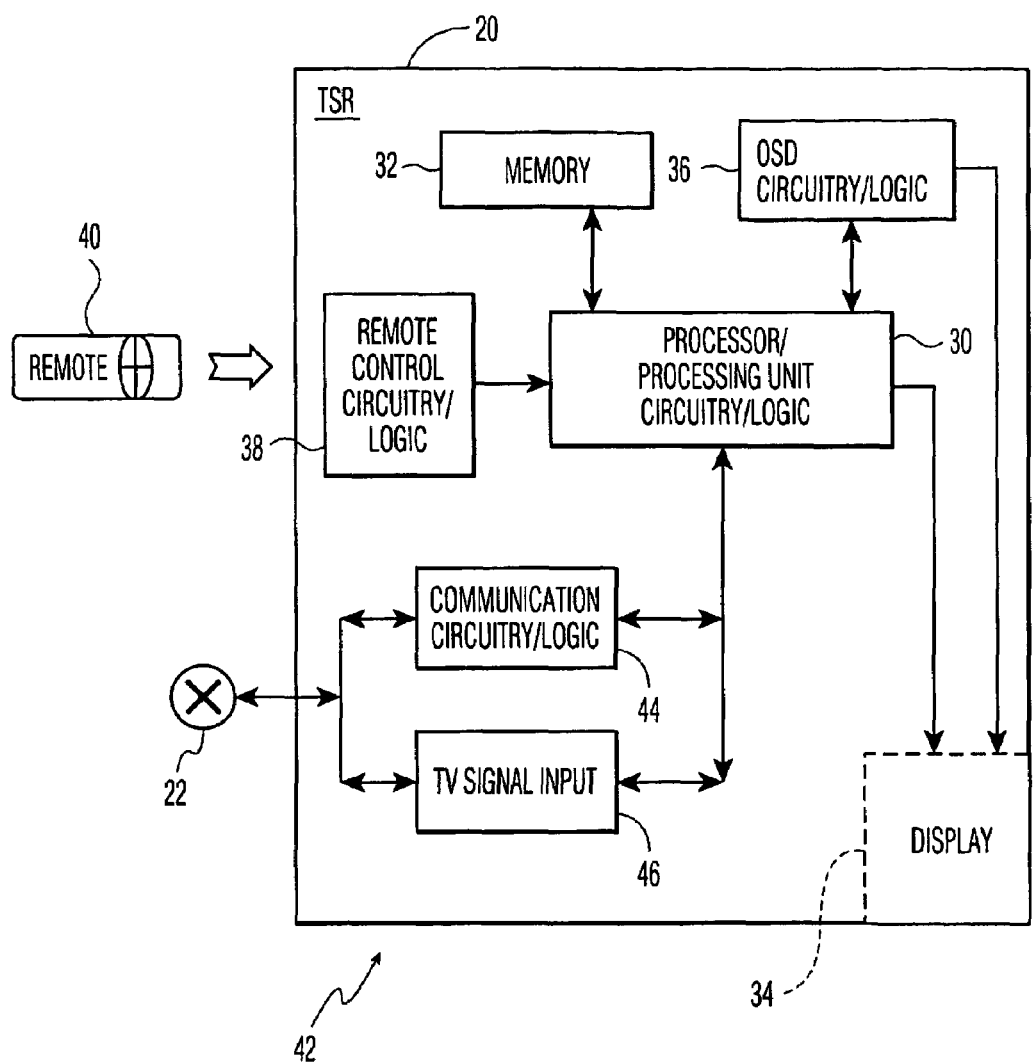
FIG. 5 is a block diagram representation of exemplary components of the exemplary television signal receivers of FIGS. 4A-D.

Referring to FIG. 5, there is depicted a block diagram of various components of a television signal receiver (TSR) 20. It should be appreciated that the components shown in FIG. 5 are exemplary of typically common components of a TSR. Some of the components, however, may apply to only certain TSRs. The TSR 20 includes a processor, processing unit, or processor/processing unit circuitry/logic 30. The processor 30 controls the various components and processes thereof of the TSR 20. The TSR 20 also includes memory 32 of an appropriate kind (e.g. ROM, RAM, EPROM, or the like) that is in communication with the processor 30. The memory 32 stores program instructions that are utilized by the processor 30 for operation of the TSR 20. An on-screen display (OSD) unit or circuitry/logic 36 is provided that is in communication with the processor 30. The OSD 36 is operative under control of the processor 30 to generate signals for providing on-screen display of alphanumeric characters and the like. The OSD 36 is also operative to provide on-screen display of menus with selectable menu items.

The TSR 20 may also include a display 34 that is in communication with the processor 30 and the OSD 36. The display 34 is shown in dashed lines to represent that the display 34 may or may not be integral with the TSR 20. The display 34 may be any kind of display that is operative to show video television signals.

The TSR 20 further includes remote control circuitry/logic 38 that is in communication with the processor 30. The remote control circuitry/logic 38 is operative to receive and process remote control signals from a remote 40. The remote 40 includes typical functions and/or features of a remote for a television signal receiver. These functions and/or features are accessible by buttons, keys, or the like on the remote, or are selectable directly via buttons, keys, or the like. The remote 40 also includes functions and/or feature specific to the particular TSR.

The TSR 20 also has a communication portion 42 that is operative to receive transmissions/signals from the TSP 14 and provide transmissions/signals to the TSP 14. To this end, the communication portion 42 includes communication circuitry/logic 44 such as a modem or the like that is in communication with the processor 30 of the TSR 20 and the TSP 14 via the splitter/combiner 22. The communication portion 42 also includes television signal input processing circuitry/logic 46 that may include a tuner and/or other television signal processing both for video and audio. Both the communication circuitry/logic 44 and the television signal input processing circuitry/logic 46 communicate with the TSP 14 using the same path. In one form, the path is a coaxial cable that is operative to accept and transmit television signals and communication signals.

The remote 40 and remote control circuitry/logic 38 allow a user to select a particular television channel for viewing, recording, or the like. The processor 30, in response to the user selection of a television channel, provides selection, control, or request signals via the communication circuitry/logic 44 to the TSP 14. The TSP 14, in response to the receipt of a channel selection signal from the TSR 20, is operative to produce, generate and/or obtain an optimum television channel signal corresponding to the selected television channel from the television signals received by the antenna array 12 in accordance with the present principles. The TSP 14 is further operative to provide the optimum television channel signal to the TSR 20. It should be appreciated that the information/data may not come from a remote, but may come from a television or other device coupled to the TSR 20. This would occur through the communication circuitry/logic 44 that would be in communication with the television or other device.

The TSR 20 is also operative to allow user selection of a television viewing channel on which the selected television channel should be broadcast. The television viewing channel is a television channel that is different than the selected television channel. AS examples of the above, if a user desires to watch channel 23, channel 23 is selected as the television channel. A "channel 23" signal is then sent to the TSP 14. The TSP 14 obtains and provides an optimum channel 23 signal to the TSR 20. The user then views channel 23 on channel 23. If a user desires to watch channel 23 programming, but wants to view channel 23 programming on channel 99, a "channel 23" signal is generated by the TSR 20 and forwarded to the TSP 14 for obtaining an optimum channel 23 television signal. In addition, a channel translation signal is also generated to indicate to the TSP 14 that the optimum channel 23 signal is to be provided on channel 99. The TSP 14, after obtaining the optimum channel 23 signal translates the optimum channel 23 signal into a channel 99 signal and transmits same to the TSR 20.

It should further be appreciated that each TSR is operative in the manner set forth for the TSR 20 of FIG. 5. Thus, each TSR 20 is operative to allow selection of a television channel and provide the selection to the TSP 14. Each TSR 20 is also operative to assign a different channel number to the television channel transmitted by the TSP 14. When assigned channel numbers conflict, a first received priority may be utilized.

Figure 6:
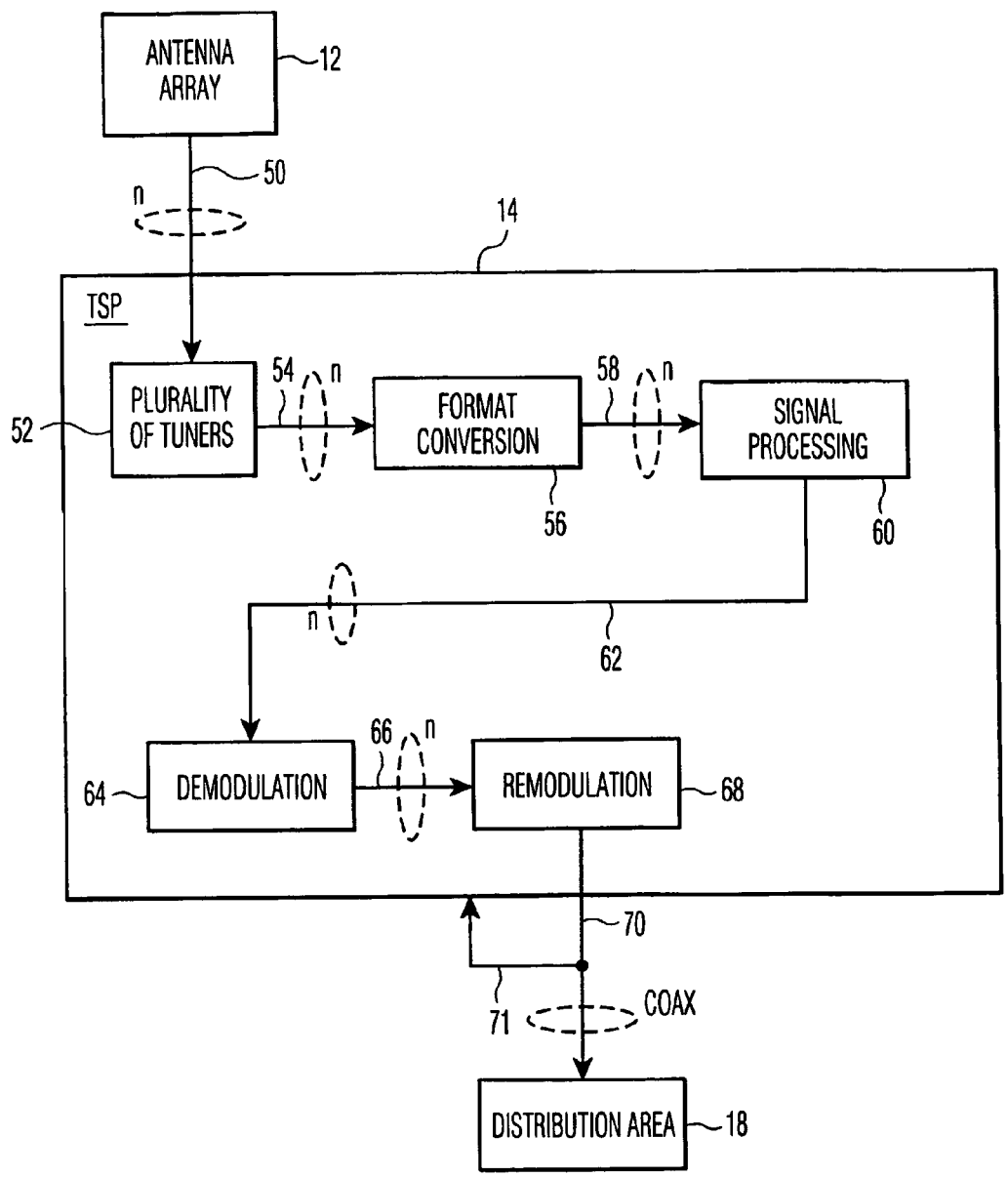
FIG. 6 is a block diagram representation of an exemplary television signal processor (TSP) in accordance with the principles of the subject invention.

Referring now to FIG. 6, there is depicted a block diagram of an exemplary television signal processor (TSP) 14. The TSP 14 is in communication with the antenna array 12 via a conductor 50 of n number of separate conductors. In this manner each antenna of the antenna array 12 is separately connected to the TSP 14. While this is a straight forward manner of providing separate television signals to the TSP 14, other manners of providing the television signals from a plurality of antenna to the TSP 14 without using separate conductors for each antenna are contemplated. One alternative manner would be to actively multiplex the separate television signals before being forwarded to the TSP 14. This would require circuitry/logic at the antenna array 12 as well as at the TSP 14.

The TSP 14 includes a plurality of tuners 52, a format converter or format conversion circuitry/logic 56, signal processing circuitry/logic 60, a demodulator or demodulation circuitry/logic 64, and a remodulator or remodulation circuitry/logic 68. The TSP 14 is in communication with distribution area 18 via a conductor 70, operative to carrying multiple television channel signals and communication signals, such as coaxial (coax) cable. It should be appreciated that the TSP 14 is exemplary. Therefore, the various components may or may not necessarily be essential to a TSP. Depending on intended use, TSPs may differ in components.

Each antenna of the antenna array 12 is in communication with (coupled to) one of the plurality of tuners 52. Thus, a television signal comprising a number of television channels is received by each antenna and forwarded to a separate tuner. Each tuner of the plurality of tuners 52 is operative to tune to a particular television channel of the received television signal. The output of each tuner (a television channel) is input to format conversion circuitry/logic 56. The format converter 56 is operative to provide signal format conversion if necessary on each individual television channel signal. Since each tuner output (television channel) is a separate signal, an n-number conductor 54 (corresponding to the number of tuners) provides communication between the plurality of tuners 52 and the format converter 56.

The format converter 56 is in communication with the signal processor 60 via an n-number conductor 58. The signal processor 60 is operative to receive the various television channel signals and produce, generate, or obtain an optimum television channel signal for each television channel. The signal processor 60 is in communication with the demodulator 64 via an n-number conductor 62. Each optimum television channel signal is demodulated by the demodulator 64 to obtain a demodulated optimum television channel signal. The demodulator 64 is in communication with the remodulator 68 via an n-number conductor 66. Each demodulated optimum television channel signal is then remodulated before distribution via coaxial cable 70.

The demodulator 64 is operative to demodulate one or more types of modulation schemes depending on the intended use of the TSP. For instance, if the TSP is to receive only (terrestrial) digital television signals from the antenna array 12, the TSP 14 demodulator may only demodulate VSB encoded television signals, which is the current digital modulation scheme of choice for terrestrial broadcast television signals. If the TSP 14 is to receive only (terrestrial) analog television signals from the antenna array 12, the TSP 14 demodulator may only demodulate NTSC encoded television signals, which is the current analog transmission standard for the United States. If the TSP 14 is to receive both digital and analog television signals, the demodulator 64 demodulates both analog and digital television signals. The modulation schemes may be different as VSB and NTSC are only exemplary of modulation schemes.

The remodulator 68 is operative to modulate the demodulated optimum television channel signals according to a particular output format (modulation scheme) for the device or devices receiving the distribution. The modulation scheme may be VSB for a digital device or component, NTSC for an analog device or component, a combination of a digital modulation scheme and an analog modulation scheme, or another format. The demodulator 64 is in communication with the remodulator 68 via an n-number conductor 66.

The TSP 14 is provided control or request signals from each TSR 20 via the connecting conductor(s), preferably a coaxial cable (coax 70). The TSP 14 is operative to receive the control or request signals from each TSR 20 and uses the control signals to obtain and/or generate television channel signals for the TSR through television signals received by the antenna array 12 and the components and/or circuitry/logic of the TSP 14.

Figure 7:
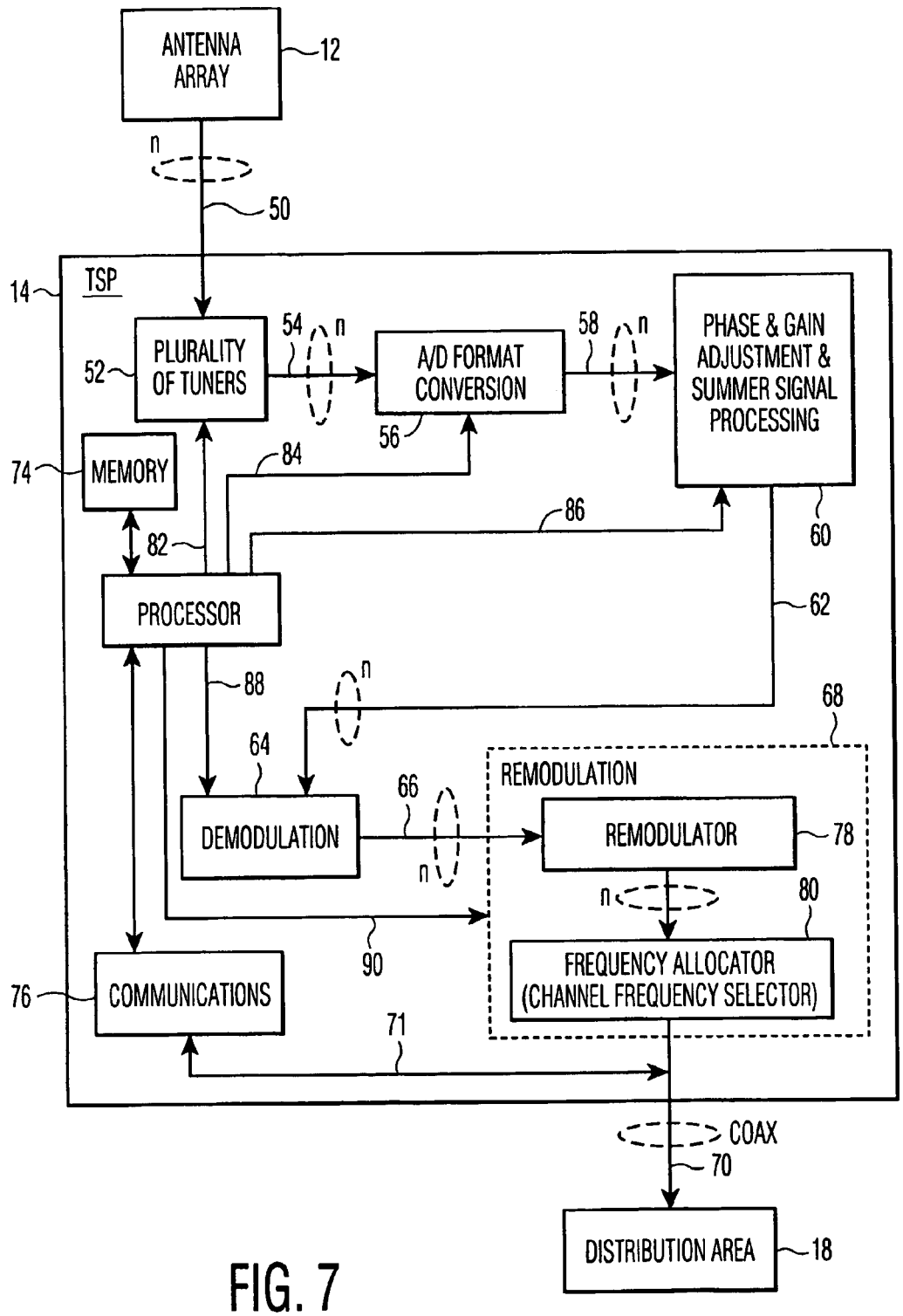
FIG. 7 is a more detailed block diagram representation of an exemplary television signal processor in accordance with the principles of the subject invention.

Referring to FIG. 7, there is depicted a detailed block diagram of an exemplary TSP 14. The TSP 14 of FIG. 7 includes a processor, processing unit, or the like (collectively, processor) 72 and memory 74 of an appropriate type that contains or stores program instructions. The program instructions are utilized by the processor 72 and optionally by the other components of the TSP 14. The TSP 14 also includes communication circuitry/logic 76 such as a modem or the like that is in communication with the processor 72 and coupled to the distribution conductor 70. The communications 76 provides bidirectional communication between the TSP 14 and the TSRs 20. In this manner, the TSP 14 may receive control or request signals from each TSR. The TSP 14 may also provide communication, other than providing television channels, to the TSRs 20.

The TSP 14 of FIG. 7 also provides analog to digital (A/D) format conversion (digitizing) as the format converter 56 for each output of the plurality of tuners 52. The plurality of tuners 52 is shown in communication with the A/D signal conversion 56 via an n-number conductor or connector 54. Thus, after each tuner of the plurality of tuners 52 has tuned to a television channel, each tuned television channel signal is converted from the analog domain to the digital domain by a respective A/D converter. Thereafter, each tuned television channel signal undergoes signal processing by the signal processing circuitry/logic 60. The A/D format conversion 56 is thus shown in communication with the signal processing 60 via an n-number conductor, connector, or path 58. In the TSP 14 of FIG. 7, such signal processing includes signal phase and gain adjustment, and signal summation. This is accomplished for each set of television channel signals that constitute the same television channel. Particularly, the signal processing 60 separately adjusts the phase and gain of each set of television channel signals, a set of television channel signals consisting of all television channel signals that are the same television channel, and sums the set of television channel signals to provide an optimum or aggregate television channel signal for each set of television channel signals.

The signal processor 60 is shown as in communication with the demodulation circuitry/logic 64 via an n-number conductor, connector, or path 62. Each optimum television channel signal is outputted to the demodulator 64. The demodulator 64 demodulates each optimum television channel signal from the signal processor 60. The demodulator 64 is operative to demodulate one or more types of modulation schemes such as VSB (digital), and NTSC (analog) according to the modulation scheme of the original television channel signal (i.e. the terrestrially broadcast television channel).

The demodulator 64 is shown in communication with the remodulation circuitry/logic 68 via an n-number conductor, connector, or path 66. Each demodulated optimum television channel signal is thus provided to the remodulation circuitry/logic 68. The remodulation circuitry/logic 68 includes a remodulator 78 and a frequency allocator (television channel/frequency selector) 80. Each demodulated optimum television channel signal is remodulated according to a particular digital or analog modulation scheme (e.g. VSB, NTSC, etc.) by the remodulator 78. A remodulated optimum television channel signal may be provided as an output of the TSP 14 on a television channel that is different than the original television channel provided the different television channel does not conflict with another remodulated optimum television channel signal. The frequency allocator 80 translates the channel (carrier frequency or frequency band) to a different channel if requested by the TSR 20. Each remodulated optimum television channel signal is then provided for distribution 18 preferably via a single conductor capable of carrying various signals within a frequency range such as coax.

The processor 72, under control by program instructions stored in the memory 74, provides control signals to the various circuitry/logic of the TSP 14 as represented by the arrows originating from the processor 72 and oriented toward (pointing to) particular circultry/logic. Thus, the processor 72 is in communication with the plurality of tuners 52 via a control line 82. The processor 72 provides a control signal to each tuner of the plurality of tuners 52 such that each tuner is caused to tune to particular television channel. If the processor 72 receives only one request or control signal from a TSR 20, all of the plurality of tuners will be tuned to the same television channel. Consequently, the TSP 14 will only provide one optimum television channel signal as an output. If two or more control signals or requests are received by the TSP 14 from two or more TSRs 20, the TSP must determine what combination of antenna of the plurality of antenna will provide the two or more best combined signals for the two or more optimum television channel signals provided as outputs of the TSP 14. The determination of the best combination of antennas based on various factors or characteristics of a particular television channel for a particular antenna of the plurality of antenna 12. Such various factors or characteristics may include signal strength, signal continuity, and the like.

The processor 72 is also in communication with the formation conversion circuitry/logic 56 via a control line 84. The processor 72 provides control signals to the conversion circuitry/logic 56 as necessary to complete any necessary signal conversion. The processor 72 is further in communication with the phase and gain, and summer signal processing 60 via a control line 86. The processor 72 provides control signals to the signal processing 60 as appropriate. The processor 72 is still further in communication with the demodulation 64 via a control line 88. The processor 72 provides control signals to the demodulator 64 as necessary, such as to apply the correct demodulation scheme to the various optimum television channel signals. Still further, the processor 72 is in communication with the remodulation 68 via a control line 90. The processor 72 provides control signals to the remodulator 68 as necessary, such as to apply the correct modulation scheme to the various demodulated optimum television channel signals before distribution thereof.

Figure 8:
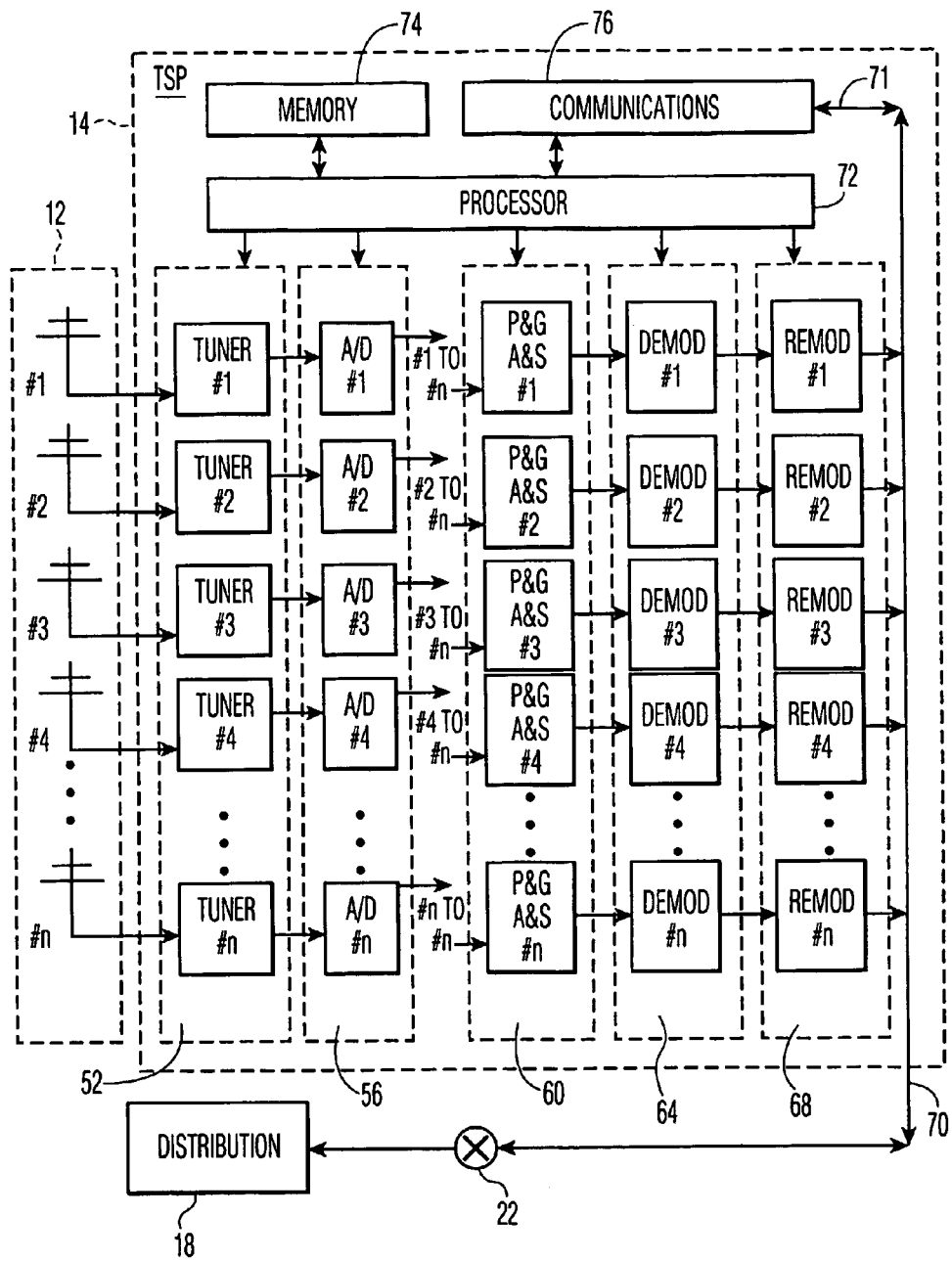
FIG. 8 is a block diagram representation of an exemplary television signal receiving, processing, and distribution system in accordance with the principles of the subject invention.

Referring to FIG. 8, there is depicted a block diagram of an exemplary embodiment of a TSP 14. The antenna array 12 is shown having any number of separate antennas, represented by the labeled antenna #1 through antenna #n. Each antenna is coupled to a tuner of the plurality of tuners 52, represented by the labeled tuner #1 through tuner #n. Particularly, the number of individual tuners of the plurality of tuners 52 is the same number as the number of antennas or television signals inputs. In this manner, each antenna receives a separate television signal and each separate television signal it tuned by a respective tuner to a particular television channel. The output of each tuner is separately format converted (here converted from an analog format to a digital format), represented by the plurality of A/D converters, labeled A/D #1 through A/D #n.

The output of each A/D converter is in communication with each phase and gain adjuster and summer (P&GA&S), represented by the P&GA&S #1 through P&GA&S #n of the plurality of phase and gain adjustment and summers 60. This is represented in FIG. 8 as an output arrow labeled "#1 to #n" from each separate AND of the format converter 56, and as an input arrow labeled "#1 to #n" into each separate P&GA&S of the signal processor 64. While each A/D output is in communication with each P&GA&S, the output signal of each A/D (a television channel) is controlled such that only television channel signals of the same television channel are presented to a particular P&GA&S.

For example, if the tuners #1, #4, and #n are tuning into channel 92 and tuners #2, and #3 are tuning into channel 65, the output signals of A/Ds #1, #4, and #n are provided to one of the P&GA&S, say P&GA&S #1, while the output signals of A/Ds #2 and #3 are provided to another one of the P&GA&S, say P&GA&S #2. The three television channel signals (for channel 92) are all phase and gain aligned, then summed to obtain an optimum television channel signal for channel 92. The two television channel signals (for channel 65) are all phase and gain aligned, then summed to obtain an optimum television channel signal for channel 65. Each P&GA&S thus provides phase and gain aligning and summation to a one set of television channel signals (i.e. any number of television channel signals of a particular channel). The TSP 14 may process from only one television channel to up to "n" number of television channels. In the case of one television channel being requested by a TSR 20, all of the television channel signals from each tuner #1 through #n are phase and gain adjusted and summed in one P&GA&S. In the case of "n" number of television channels requested by "n" number of TSRs, individual television channel signals are used to provide the optimum television channel signal.

The processor 72 is operative to select the antenna providing a particular television channel to optimize the optimum television channel signal. Thus, in the typical case where two or more television channels are requested by two or more TSRs 20, the signals from certain antennas are selected to make up the set of television channel signals that provide the optimum television channel signal for each selected television channel.

The output of each P&GA&S (an optimum television channel signal) is demodulated by an individual demodulator, represented by DeMods #1 through #n. The respective demodulator is operative to demodulate the optimum television channel signal.

Lastly, each demodulated optimum television channel signal is remodulated (modulated) via a respective remodulation unit, labeled ReMod #1 through #n before distribution. The remodulation may be the same modulation as demodulated or may be another modulation scheme. The modulation scheme preferably is chosen to accommodate the format of an output device such as a display. Thereafter, a remodulated optimum television channel signal is provided for distribution.

Figure 9:
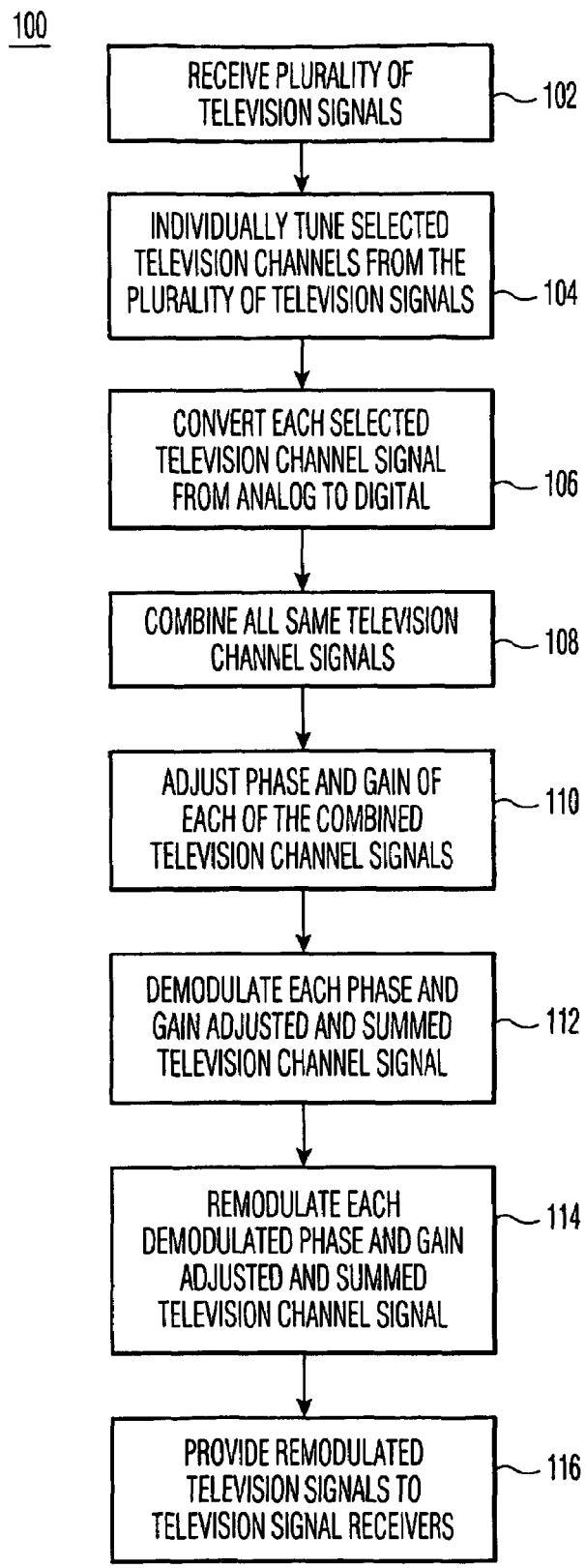
FIG. 9 is a flow chart of an exemplary manner of operation of the television receiving, processing, and distribution system and/or its particular components thereof.

Referring to FIG. 9, there is depicted a flow chart of an exemplary manner of operation of the television signal receiver system 10 and its various components and/or subsystems thereof, that is supplemental or in addition to the various manners of operation described herein. The flow chart of FIG. 9 is generally designated 100. In step 102, a plurality of television signals are received. In particular, each antenna of a plurality of antennas receives television signals. The television signals comprise a plurality of television channels. Typically, the television signals are terrestrially broadcast.

In step 104, a tuner individually tunes the television signal from each antenna to a selected television channel. A television signal receiver provides the selection of a television channel. In step 106, each tuned television channel signal is converted from analog to digital (digitized). Thereafter, in step 108, television channel signals that are the same are combined (i.e. the same television channel) to form a set of television channel signals (an aggregate or combined signal for each different channel). In step 110 the phase and gain of each set of television channel signals are adjusted to provide an optimum television signal for each set of television channel signals.

Each optimum television signal is demodulated in step 112. In step 114, each demodulated television channel signal is remodulated. Remodulation is preferably via the same modulation as the original television signals. Thereafter, in step 116, the remodulated television channels signals are provided to a or a plurality of TSRs.

It should be appreciated that the subject invention can be modified within the spirit and scope of this disclosure. This application is therefore intended to cover any variations, uses, of adaptations of the subject invention using its general principles. Further, this application is intended to cover such departures from the present disclosure as come within known or customary practice in the art to which this invention pertains and which fall within the limits of the appended claims.

The invention claimed is:

1. A method of processing a terrestrial television signal comprising the steps of:

Receiving a plurality of representations of the terrestrial television signal, each representation received on a separate one of a plurality of antennas, respectively;

converting each of said plurality of representations of the terrestrial television signal into one of a plurality of digitized signals;

presenting only digitized signals of the same television channel to a summing device;

separately adjusting the phase and gain of each one of said digitized signals presented to the summing device;

summing at least two of said digitized signals presented to the summing device into an aggregate signal, wherein each of said at least two digitized signals converted from one of said plurality of representations of the terrestrial television signal received on the separate one of said plurality of antennas;

demodulating said aggregate signal;

modulating said demodulated aggregate signal; and distributing said modulated aggregate signal to a television signal receiver.

2. The method of claim 1, wherein the step of receiving includes receiving the terrestrial television signal on a plurality of uni-directional antennas.

3. The method of claim 1, wherein the step of demodulating said aggregate signal includes utilizing a VSB demodulation scheme.

4. The method of claim 1, wherein the step of modulating said demodulated aggregate signal includes utilizing a VSB modulation scheme.

5. The method of claim 1, wherein the step of distributing said modulated aggregate signal to a television signal receiver includes utilizing coaxial cable.

6. The method of claim 1, wherein the step of receiving includes selecting said terrestrial television signal to receive.

7. The method of claim 6, wherein selecting said terrestrial television signal to receive is accomplished by user selection.

8. The method of claim 7, wherein user selection is accomplished via said television signal receiver.

9. An apparatus for processing a terrestrial television signal comprising:
- means for receiving a plurality of representations of the terrestrial television signal, each representation received on a separate one of a plurality of antennas, respectively;
- means for converting each of said plurality of representations of the terrestrial television signal into one of a plurality of digitized signals;
- means for presenting only digitized signals of the same television channel to a summing device;
- means for separately adjusting the phase and gain of each one of said digitized signals presented to the summing device;
- means for summing at least two of said digitized signals presented to the summing device into an aggregate signal, wherein each of said at least two digitized signals converted from one of said plurality of representations of the terrestrial television signal received on the separate one of said plurality of antennas;
- means for demodulating said aggregate signal; and
- means for modulating said demodulated aggregate signal.

10. The apparatus of claim 9, wherein said means for receiving includes means for receiving the terrestrial television signal on a plurality of uni-directional antennas.

11. The apparatus of claim 9, wherein said means for demodulating said aggregate signal utilizes a VSB demodulation scheme.

12. The apparatus of claim 9, wherein said means for modulating said demodulated aggregate signal utilizes a VSB modulation scheme.

13. The apparatus of claim 9, further comprising means for distributing said modulated aggregate signal to a television signal receiver.

14. The apparatus of claim 13, wherein said means for distributing said modulated aggregate signal to a television signal receiver utilizes coaxial cable.

15. The apparatus of claim 9, wherein said means for receiving includes means for selecting said terrestrial television signal to receive.

16. The apparatus of claim 15, wherein said means for selecting said terrestrial television signal to receive includes means for allowing user selection of said terrestrial television signal to receive.

17. The apparatus of claim 16, wherein said means for allowing user selection is accomplished via said television signal receiver.

18. An apparatus for processing a terrestrial television channel signal comprising:
- a plurality of tuners, each of which is couplable to one respective antenna of an antenna array and operative to receive the terrestrial television channel signal including one of a plurality of representations of the terrestrial television channel signal from said antenna array;
- a plurality of converters, each in communication with a respective one of said plurality of tuners and operative to convert one of said representations of said terrestrial television channel signal into one of a plurality of digitized television channel signals;
- a processing circuitry disposed between said converter and a summer, said processing circuitry in communication with said converter and said summer, said processing circuitry operative to present only digitized television channel signals of the same television channel to the summer, the processing circuitry further operative to separately adjust the phase and gain of each one of said digitized television channel signals presented to the summer;
- the summer in communication with each one of said converters and operative to combine at least two of said digitized television channel signals presented to the summer to form an aggregate television channel signal, wherein each digitized television channel signal converted from one of said representations of the terrestrial television channel signal received on one of said plurality of tuners;
- a demodulator in communication with said summer and operative to demodulate said aggregate television channel signal; and
- a modulator in communication with said demodulator and operative to modulate said demodulated aggregate television channel signal.

19. The apparatus of claim 18, wherein said demodulator utilizes a VSB demodulation scheme.

20. The apparatus of claim 18, wherein said modulator utilizes a VSB modulation scheme.

21. The apparatus of claim 18, further comprising means for distributing said modulated aggregate television channel signal to a television signal receiver.

22. The apparatus of claim 21, further comprising a selector operative to select said terrestrial television channel signal to receive.

23. The apparatus of claim 22, wherein said selector is operative to allow a user to select said terrestrial television channel signal to receive.

24. The apparatus of claim 23, wherein selection by said user is accomplished via said television signal receiver.

* * * * *